United States Patent
Maeda et al.

[11] Patent Number: 6,107,390
[45] Date of Patent: Aug. 22, 2000

[54] THERMOPLASTIC RESIN COMPOSITION CONTAINING TITANIUM DIOXIDE PIGMENT, AND PROCESS FOR PREPARING SAME

[75] Inventors: Masashi Maeda, Matsumoto; Katsura Ito, Shiojiri, both of Japan

[73] Assignee: Showa Denko K.K., Tokyo, Japan

[21] Appl. No.: 09/280,971

[22] Filed: Mar. 30, 1999

Related U.S. Application Data

[62] Division of application No. 08/906,668, Aug. 8, 1997, Pat. No. 6,017,993.

[30] Foreign Application Priority Data

Aug. 14, 1996 [JP] Japan .................................. 8-214758

[51] Int. Cl.$^7$ ...................................................... C08K 9/06
[52] U.S. Cl. ............................ 524/497; 523/205; 523/204; 523/220; 523/351
[58] Field of Search ............................ 524/497; 523/205, 523/220, 351

[56] References Cited

U.S. PATENT DOCUMENTS

| | | | |
|---|---|---|---|
| 4,407,896 | 10/1983 | Kubbota et al. | 430/536 |
| 4,447,524 | 5/1984 | Uno et al. | 428/513 |
| 4,710,535 | 12/1987 | Perrot et al. | 523/351 |
| 4,801,509 | 1/1989 | Uno et al. | 430/536 |
| 5,075,206 | 12/1991 | Noda et al. | 430/531 |
| 5,100,770 | 3/1992 | Ashida | 428/326 |
| 5,173,397 | 12/1992 | Noda et al. | 430/531 |
| 5,466,519 | 11/1995 | Shirakura et al. | 428/323 |
| 5,820,977 | 10/1998 | Shirakura et al. | 428/328 |

FOREIGN PATENT DOCUMENTS

| | | |
|---|---|---|
| 359909 | 3/1990 | European Pat. Off. . |
| 57-108849 | 7/1982 | Japan . |
| 57-109948 | 7/1982 | Japan . |
| 62-103635 | 5/1987 | Japan . |
| 1-38291 | 8/1989 | Japan . |
| 1-38292 | 8/1989 | Japan . |
| 1-38293 | 8/1989 | Japan . |
| 1257845 | 10/1989 | Japan . |
| 2-38938 | 9/1990 | Japan . |
| 2-50946 | 11/1990 | Japan . |
| 3-91740 | 4/1991 | Japan . |
| 3-2749 | 10/1991 | Japan . |
| 1204323 | 9/1970 | United Kingdom . |
| 8-912084 | 12/1989 | WIPO . |

OTHER PUBLICATIONS

"Polyofelin–coated paper for photographic printing paper—obtained by laminating fused and extruded matter of a film on paper and has good releasing properties from a cooling roller," Derwent Publ. Ltd., Abstract, Week 9226, May 18, 1992.

*Primary Examiner*—James J. Seidleck
*Assistant Examiner*—Olga Asinovsky
*Attorney, Agent, or Firm*—Sughrue, Mion, Zinn, Macpeak & Seas, PLLC

[57] ABSTRACT

A resin composition comprising a thermoplastic resin and a titanium dioxide ($TiO_2$) pigment and having a moisture content of 10–1,400 ppm as determined by a specific method. A preferable resin composition is made by (i) atomizing 0.1–3.0 wt. parts of an organopolysiloxane within a fluidized powder layer of 100 wt. parts of $TiO_2$ pigment; (ii) mixing 1–5 wt. parts of a metallic soap with 100 wt. parts of the $TiO_2$ pigment; (iii) heat-treating the thus-obtained mixture at 70–200° C. for 10 min–2 hours; and then, (iv) mixing a thermoplastic resin with the heat-treated mixture. The resin composition is used for coating paper or film, when it contains 20–60 wt. % of $TiO_2$ pigment. The resin composition is used as a master batch for the preparation of a resin composition for coating paper or film, when it contains 30–80 wt. % of $TiO_2$ pigment.

6 Claims, No Drawings

THERMOPLASTIC RESIN COMPOSITION CONTAINING TITANIUM DIOXIDE PIGMENT, AND PROCESS FOR PREPARING SAME

This is a divisional of application Ser. No. 08/906,668 filed Aug. 8, 1997, now U.S. Pat. No. 6,017,993 the disclosure of which is incorporated herein by reference.

BACKGROUND OF THE INVENTION (1) Field of the Invention

This invention relates to a thermoplastic resin composition containing a titanium dioxide pigment, and a process for preparing the thermoplastic resin composition.

The titanium dioxide pigment-containing thermoplastic resin composition is suitable as a raw material for a highly white film and especially a coating material-for photographic resin-coated paper, and a master batch for the preparation of a thermoplastic resin composition used as a coating material for coated paper.

(2) Description of the Related Art

To improve dispersibility of a titanium dioxide pigment in a resin, a technique for coating a titanium dioxide pigment particle with an inorganic surface treating agent is generally employed. Namely, about 0.1 to 2% by weight of an inorganic surface treating agent is used as a coating material which includes aluminum oxide hydrate, silicon oxide hydrate, titanium oxide hydrate, zirconium oxide hydrate, zinc hydroxide, magnesium hydroxide, manganese compounds and phosphoric acid compounds. Of these, aluminum oxide hydrate and silicon oxide hydrate are preferably used.

As means for coating one surface or both surfaces of a substrate such as paper or a polyester film with a thermoplastic resin composition containing a titanium dioxide pigment, an extrusion lamination process is generally employed.

In recent years, a high degree of whiteness and a high degree of opacity are required for coated paper and film, and therefore a thermoplastic resin composition containing a titanium dioxide pigment at a high concentration is used. However, the dispersion of titanium dioxide pigment in the conventional thermoplastic resin composition is poor, and thus, the state of a titanium dioxide coating is poor. Namely, the coated paper and film have a poor surface smoothness or bubbles within the coating.

SUMMARY OF THE INVENTION

In view of the foregoing, a primary object of the present invention is to provide a thermoplastic resin composition containing a titanium dioxide pigment, which is capable of forming a film or coating exhibiting a satisfactory surface state on paper, even when the concentration of titanium dioxide pigment in the thermo-plastic resin composition is high.

Another object of the present invention is to provide a thermoplastic resin composition containing a titanium dioxide pigment, which is used as a master batch for the preparation of a titanium dioxide pigment-containing thermo-plastic resin composition capable of forming the above-mentioned coating or film.

Still another object of the present invention is to provide a process by which a titanium dioxide pigment-containing thermoplastic resin composition can be advantageously prepared.

In one aspect of the present invention, there is provided a thermoplastic resin composition comprising a thermoplastic resin and a titanium dioxide pigment; the moisture content in the resin composition being in the range of 10 of 1,400 ppm as determined by a method wherein 3 g of the thermoplastic resin composition is humidified in an atmosphere maintained at a temperature of 60° C. and a relative humidity of 60% for 4 hours, exposed to a stream of air having an absolute humidity of 0.009 kgH$_2$O/kg of dry air at a temperature of 80° C. for 4 hours, and then the resin composition is deaerated at a temperature of 300° C. for 30 minutes, and the moisture content is calculated by the following equation:

$$A=B/C$$

wherein A is moisture content, B is content (g) of moisture as measured by the Karl Fischer method, and C is the content (g) of titanium dioxide pigment in the resin composition.

The content of a titanium dioxide pigment in the thermoplastic resin composition is usually in the range of 20 to 80% by weight based on the weight of the resin composition. More specifically, when the thermoplastic resin composition is used for forming a coating on paper or a film, the content of a titanium dioxide pigment in the thermoplastic resin composition is usually in the range of 20 to 60% by weight, and, when the thermoplastic resin composition is used as a master batch for the preparation of a thermoplastic resin composition for forming the coating, the content of a titanium dioxide pigment in the thermoplastic resin composition is usually in the range of 30 to 80% by weight.

Preferably the titanium dioxide pigment to be incorporated in the thermoplastic resin is a particle of surface-treated titanium dioxide pigment which is prepared by treating a titanium dioxide particle with 0.1 to 3.0 parts by weight of an organopolysiloxane and 1 to 5 parts by weight of a metallic soap, based on 100 parts by weight of the titanium dioxide pigment.

In another aspect of the present invention, there is provided a process for preparing a thermoplastic resin composition comprising a thermoplastic resin and a titanium dioxide pigment, which comprises the steps of:

atomizing 0.1 to 3.0 parts by weight of an organopolysiloxane as droplets having an average diameter of 1 to 100 μm within a fluidized powder layer of 100 parts by weight of a titanium dioxide pigment;

mixing 1 to 5 parts by weight of a metallic soap with 100 parts by weight of the organopolysiloxane-treated titanium dioxide pigment;

heat-treating the thus-obtained mixture at a temperature of 70 to 200° C. for a period of 10 minutes to 2 hours; and then mixing a thermoplastic resin with the heat-treated mixture.

The titanium dioxide pigment in the moisture content-controlled thermoplastic resin composition exhibits good dispersibility, and a coating formed on paper or film from the thermoplastic resin composition has a satisfactory surface smoothness and does not have bubbles therein.

DESCRIPTION OF THE PREFERRED EMBODIMENT

Titanium dioxide used in the present invention may have any structure of anatase-type and rutile-type. The process for preparing the titanium dioxide is not particularly limited and may be prepared by, for example, a chlorine process and a sulfuric acid process. The titanium dioxide preferably has an average particle diameter of 0.1 to 0.3 μm in view of optical characteristics of the thermo-plastic resin composition. With an average particle diameter smaller or larger than this range, optical characteristics such as light scattering and shade are deteriorated.

To enhance light stability and dispersibility of titanium dioxide, the titanium dioxide is preferably subjected to a surface treatment with an inorganic surface treating agent. The surface treating agent may be conventional and includes inorganic metal compounds such as aluminum oxide, silicon oxide and zirconium oxide, and hydrates thereof.

Of the inorganic surface-treating agents, aluminum oxide hydrate is preferable. The amount of aluminum oxide hydrate used is preferably in the range of 0.1 to 0.8 part by weight expressed in terms of aluminum oxide based on 100 parts by weight of titanium dioxide. If the amount of aluminum oxide hydrate is smaller than this range, the catalytic action of titanium dioxide due to light cannot be desirably controlled and the resin composition is apt to be deteriorated with the lapse of time. Further the dispersibility of titanium dioxide in the thermoplastic resin becomes poor. If the amount of aluminum oxide hydrate is larger than this range, the amount of water accompanying aluminum oxide undesirably increases and the melt-extrusion lamination becomes difficult.

An organopolysiloxane preferably used for coating titanium dioxide in the present invention is a compound having a siloxane bond, represented by the following formula:

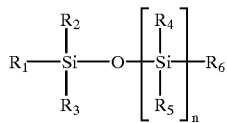

wherein $R_1$, $R_2$, $R_3$, $R_4$, $R_5$ and $R_6$ independently represent a hydrogen atom, a hydroxyl group, an alkyl group having 1 to 7 carbon atoms, a cycloalkyl group having 3 to 8 carbon atoms, an aryl group having 6 to 14 carbon atoms, an aralkyl group having 7 to 12 carbon atoms, an alkenyl group having 2 to 8 carbon atoms, an alkoxy group having 1 to 7 carbon atoms, an aryloxy group having 6 to 14 carbon atoms, an aralkyloxy group having 7 to 12 carbon atoms, an alkenyloxy group having having 2 to 8 carbon atoms, and n is an integer of at least 1.

As specific examples of $R_1$ through $R_6$, there can be mentioned an alkyl group such as methyl, ethyl, propyl, butyl or hexyl, an aryl group such as phenyl, naphtyl or anthryl, an aralkyl group such as benzyl, phenethyl or naphthylmethyl, an alkenyl group such as vinyl, allyl or styryl, an alkoxy group such as methoxy or ethoxy, an aryloxy group such as phenoxy, naphthyloxy or anthryloxy, an aralkyloxy group such as benzyloxy, phenethyloxy and naphthylmethyloxy, an alkenyloxy group such as vinyloxy, allyloxy or styryloxy. A glycidyl group may also be included.

As specific examples of the organopolysiloxane, there can be mentioned chain organopolysiloxanes such as methyl hydrogenpolysiloxane and dimethyl polysiloxane, cyclic dimethyl polysiloxane, methylmethoxy polysiloxane, ethylethoxy polysiloxane, methylethoxy polysiloxane, cyclic diphenyl polysiloxane and cyclic methylphenyl polysiloxane. These organopolysiloxanes may be used either alone or in combination.

By treating titanium dioxide with the organopolysiloxane, active hydroxyl groups present-on the surface of titanium dioxide are reacted with the organopolysiloxane, and a uniform and dense coating of organopolysiloxane is formed. To enhance the efficiency of this reaction, the organopolysiloxane preferably has a molecular weight not larger than 1,500. Especially methylmethoxy polysiloxane is preferable because of ease of synthesis, good stability and high reactivity with the surface of titanium dioxide.

The amount of the organopolysiloxane used is preferably in the range of 0.1 to 3.0 parts by weight based on 100 parts by weight of titanium dioxide. If the amount of the organopolysiloxane is smaller than 0.1 part by weight, the effect of masking moisture is insufficient, and, cracks are liable to be formed on a film produced by a melt-extrusion lamination. The use of the organopolysiloxane in an amount exceeding 3.0 parts by weight is not economically advantageous because the effect of masking moisture is approximately on the same level as that achieved with the amount of 3.0 parts by weight, and further, the film produced has rather deteriorated characteristics because of decomposition of the organopolysiloxane.

The treatment of titanium dioxide with the organopolysiloxane is carried out as follows. The organopolysiloxane is atomized, not onto the exposed surface of a fluidized powder layer of titanium dioxide, but within the fluidized powder layer of titanium dioxide. When the organopolysiloxane used is liquid, it is usually applied as it is. When the organopolysiloxane applied is solid or viscous liquid, it is usually used as a solution in an organic solvent such as methanol or ethanol. The liquid organopolysiloxane or organopolysiloxane solution is atomized as droplets having an average diameter of 1 to 100 μm. If the atomized droplets have an average diameter smaller than 1 μm, the droplets are liable to fly off. In contrast, if the atomized droplets have an average diameter larger than 100 μm, the droplets are not uniformly dispersed and the resulting coating is not uniform.

The organopolysiloxane-applied titanium dioxide is preferably heated at a temperature of 100 to 150° C. for about on hour.

After the treatment with the organopolysiloxane, a metallic soap is mixed with the organopolysiloxane-treated titanium dioxide. The mixture is kneaded together by using a kneader. The kneader may be conventional but a high-speed shearing kneader is preferable.

The metallic soap used is usually metallic salts of a higher fatty acid. As examples of the metallic soap, there can be mentioned zinc stearate, calcium stearate, barium stearate, magnesium stearate, aluminum stearate, calcium laurate, magnesium laurate and zinc laurate. The amount of the metallic soap is preferably in the range of 1 to 5 parts by weight based on 100 parts by weight of titanium dioxide. If the amount of the metallic soap is too small, coated paper with a coating having a good smoothness and containing no bubbles is difficult to obtain. If the amount of the metallic soap is too large, when a thermoplastic resin composition is extrusion-laminated, a salient amount of smoke is discharged and the working environment is polluted, and further, the film characteristics of the resulting coating are deteriorated.

To enhance the film characteristics of the coating formed on paper, the kneading of a mixture of the organopolysiloxane-treated titanium dioxide with the metallic soap is preferably conducted within 24 hours after completion of the treatment with the organopolysiloxane.

After the kneading of the metallic soap-incorporated mixture, the mixture is then heat-treated at a temperature of 70 to 200° C. for 10 minutes to 2 hours. If the heating temperature is lower than 70° C., a coating of a good state becomes difficult to obtain. In contrast, if the heating temperature is higher than 200° C., the organopolysiloxane is deteriorated and the film characteristics of the coating become poor.

The heat-treatment of the kneaded mixture can be conducted either by heating the kneader having charged the mixture therein or by using another heating apparatus.

The titanium dioxide pigment which has been surface-treated in the above-mentioned manner is then incorporated in a thermoplastic resin, and the mixture is kneaded together. The kneading can be conducted by using a conventional kneader which includes, for example, a batchwise kneader (such as Banbury mixer), a twin-screw kneader and a single screw extruder having a kneading function.

The thermoplastic resin used is not particularly limited provided that a coating of the intended good state and characteristics is formed therefrom. As examples of the thermoplastic resin, there can be mentioned polyolefins such as polyethylene, polypropylene, an ethylene-propylene copolymer (including random and block copolymers) and polystyrene, as ABS resin, an AS resin, polyvinyl chloride, polyester, polyacetal, polycarbonate, poly-aromatic ethers, poly-aromatic esters and polysulfones, of these, polyolefins are preferable because a coating having good film characteristics is obtained.

The surface-treated titanium dioxide pigment is incorporated in a thermoplastic resin to prepare a thermo-plastic resin composition. The amount of the surface-treated titanium dioxide pigment is usually in the range of 20 to 80% by weight based on the weight of the thermoplastic resin composition. When the thermoplastic resin composition has incorporated therein a relatively small amount, i.e., 20 to 60% by weight, of the surface-treated titanium dioxide pigment, the resin composition is used for forming a coating on paper or film. When the thermoplastic resin composition has incorporated therein a relatively large amount, i.e., 30 to 80% by weight, of the pigment, the resin composition is used as a master batch for the preparation of a thermo-plastic resin composition for forming a coating on paper or film. The master batch is usually in the form of a pellet, and is blended with a thermoplastic resin composition containing no pigment or containing a very minor amount of the pigment to form a thermoplastic resin composition containing the pigment at a concentration desired for forming a coating on paper or film.

If the content of the surface-treated titanium dioxide pigment in the master batch is smaller than 30% by weight, a thermoplastic resin composition containing the pigment at the desired concentration is difficult to prepare, and thus, the intended optical characteristics such as high opacity and high whiteness are difficult to achieve. In contrast, if the content of the pigment in the master batch is larger than 80% by weight, the pigment is difficult to uniformly disperse in this master batch.

If the content of the surface-treated titanium dioxide in the thermoplastic resin composition for coating paper or film is smaller than 20% by weight, the intended optical characteristics are difficult to obtain. In contrast, if the content of the pigment in the resin composition is larger than 60% by weight, when a highly white coating or film is made therefrom, the coating or film has defects such as bubbles caused by volatile matter such as moisture accompanying the salient amount of the pigment.

The thermoplastic resin composition prepared by the above-mentioned process contains a desirably controlled amount, i.e., 10 to 1,400 ppm, of moisture. The moisture content is determined by a method wherein 3 g of the thermo-plastic resin composition is humidified in an atmosphere maintained at a temperature of 60° C. and a relative humidity of 60% for 4 hours, exposed to a stream of air having an absolute humidity of 0.009 kgH$_2$O/kg of dry air at a temperature of 80° C. for 4 hours, and then the resin composition is deaerated at a temperature of 300° C. for 30 minutes, and the moisture content is calculated by the following equation:

$$A=B/C$$

wherein A is moisture content, B is content (g) of moisture as measured by the Karl Fischer method, and C is the content (g) of titanium dioxide pigment in the resin composition. In this specification, the moisture content is expressed in terms of the unit "ppm".

If the moisture content in the thermoplastic resin composition exceeds 1,400 ppm, when a coating of film is made by extrusion lamination, the coating or film has surface defects. In contrast, if the moisture content in the thermoplastic resin composition is smaller than 10 ppm, the surface-treated titanium dioxide pigment has a poor stability and the coating or film has poor optical characteristics and surface smoothness. Preferably the content of moisture in the thermoplastic resin is in the range of 10 to 1,000 ppm.

When the moisture content in the thermoplastic resin composition is controlled in the above range, even though the content of the surface-treated titanium dioxide pigment is increased, coated paper or film having the desired surface smoothness and good surface state can be obtained.

The invention will now be described by the following examples and comparative examples that by no means limit the scope of of the invention.

EXAMPLE 1

In 2,500 liters of pure water, 300 kg of commercially available rutile titanium dioxide having an average particle diameter of 0.25 μm ("Super-Titania G" supplied by Showa Titanium Co.) was dispersed. An aqueous sodium aluminate solution was added to the aqueous dispersion in an amount such that the surface-treated titanium dioxide contained 0.5% by weight (expressed as alumina) of alumina hydrate. Then the dispersion was diluted with dilute sulfuric acid, filtered, washed, and finally dried at 150° C. for 1 hour to give 270 kg of titanium dioxide having surface-treated with alumina hydrate.

By using a high-speed shearing mixer ("FM 75" supplied by Mitsui Mining Co.), 20 kg of the surface-treated titanium dioxide was stirred at a revolution of 700 rpm to form a good fluidized powder layer. A two-nozzle spray gun (Flat-spray 1/4J supplied by Spraying System Co.) was placed in the fluidized powder layer so that the entire nozzle was lost within the powder layer, while the spray gun was observed by the naked eye. 200 g of methylmethoxy polysiloxane having a molecular weight of 250 to 500 was atomized through the spray gun by blowing a nitrogen gas at a pressure of 5 kg/cm$^2$. Measurement of the average diameter of the atomized droplets as measured previously when atomized under the same conditions revealed that the droplet diameter was 15 μm. After completion of atomizing, the surface treated titanium dioxide was dried at 150° C. for 1 hour, and then, 1 kg of zinc stearate was added and kneaded together with the titanium dioxide by a Henschel mixer.

20 kg of the thus-obtained titanium dioxide pigment powder was mixed with 20 kg of low-density polyethylene ("J-REX LDL133K" supplied by Japan Polyolefins Co.). The mixture was melt-extruded through a twin-screw extruder whereby a master batch in the from of a pellet having a diameter of about 3 mm and a length of about 5 mm was obtained. The content of moisture in the master batch as measured by the above-mentioned method was 900 ppm.

The master batch was kneaded together with the above-mentioned low-density polyethylene ("J-REX LDL133K") at a mixing ratio of 1/0.667 by weight by using a labo-plastomill (an extruder with a screw having a diameter of 20 mm, supplied by Toyo Seiki K.K.) to give a polyethylene resin composition. The content of moisture in this resin composition was 910 ppm.

The polyethylene resin composition was melt-extruded by an extrusion-lamination procedure onto a surface of wood-free paper with a thickness of 200 μm to form a laminate having a coating with a thickness of 20 μm. The surface state of the coated paper was observed by the naked eye to examine the degree of smoothness and the presence of bubbles and micro-spots. The evaluation result of the surface state was "A", as expressed by the following four ratings.

A: the number of bubbles and micro-spots is smaller than 2 per 100 cm$^2$ and the coated surface is almost mirror-smooth.

B: the number of bubbles and micro-spots is at least 2 but smaller than 5 per 100 cm$^2$ and the coated surface has a good smoothness.

C: the number of bubbles and micro-spots is at least 5 but smaller than 10 per 100 cm$^2$ and the coated surface has somewhat poor smoothness.

D: the number of bubbles and micro-spots is at least 10 per 100 cm$^2$ and the coated surface has poor smoothness.

EXAMPLE 2

By the same procedures as described in Example 1, a master batch and a polyethylene resin composition were made from the same rutile titanium dioxide as used in Example 1 wherein the treatment of titanium dioxide with alumina hydrate was not conducted and the average diameter of atomized droplets was changed to 19 μm. All other conditions remained the substantially the same.

The production conditions are shown in Table 1. The evaluation results of the master batch, the polyethylene resin composition and the coated paper are shown in Table 2.

EXAMPLE 3

By the same procedures as described in Example 1, a master batch and a polyethylene resin composition were made from anatase titanium dioxide having an average particle diameter of 0.1 μm ("TCA123" supplied by Tochem Products Co.) instead of rutile titanium dioxide wherein the average diameter of atomized droplets was changed to 30 μm. All other conditions remained the substantially the same.

The production conditions are shown in Table 1. The evaluation results of the master batch, the polyethylene resin composition and the coated paper are shown in Table 2.

EXAMPLE 4

By the same procedures as described in Example 1, a master batch and a polyethylene resin composition were made from the same anatase titanium dioxide as used in Example 3 wherein the treatment of titanium dioxide with alumina hydrate was not conducted and the average diameter of atomized droplets was changed to 60 μm. All other conditions remained the substantially the same.

The production conditions are shown in Table 1. The evaluation results of the master batch, the polyethylene resin composition and the coated paper are shown in Table 2.

EXAMPLES 5–20

Master batches and polyethylene resin compositions were made under the same production conditions and by the same procedures as those recited in Table 1. The other conditions and procedures which are not described in Table 1 were the same as employed in Example 3.

In Examples 10, 11 and 12, methylhydrogen polysiloxane having a molecular weight of 200 to 400, dimethyl polysiloxane having a molecular weight of 150 to 300 and methylphenyl polysiloxane having a molecular weight of 300 to 800 were used, respectively, as the organopolysiloxane.

The evaluation results of the master batch, the polyethylene resin composition and the coated paper are shown in Table 2.

COMPARATIVE EXAMPLES 1–9

Master batches and polyethylene resin compositions were made from alumina hydrate-treated anatase titanium dioxide which was the same as that used in Example 3. The amount of organopolysiloxane, the average diameter of atomized droplets, the amount of metallic soap and the conditions under which heattreating was conducted after mixing were varied so that at least one of these conditions was outside the claimed ranges, as shown in Table 1.

The evaluation results of the master batch, the polyethylene resin composition and the coated paper are shown in Table 2.

As seen from the data shown in Table 2, even though the content of titanium dioxide pigment in the thermoplastic resin composition of the present invention is high, coated paper having a coating with good smooth surface and good surface state is obtained.

TABLE 1

| Ex. No. *1 | Metallic soap and amount*2 (parts/ 100 parts of TiO$_2$) | Heat-treating condition*3 Temp (° C.) | Time (hr) | Content of TiO$_2$ in master batch (wt. %) | in resin composition (wt. %) | Content of moisture in master batch (ppm) | in resin composition (ppm) | State of coating |
|---|---|---|---|---|---|---|---|---|
| 1 | Zn-St 4 | 150 | 0.5 | 50 | 30 | 900 | 910 | A |
| 2 | " 4 | 150 | 0.5 | 50 | 30 | 860 | 870 | A |
| 3 | " 4 | 125 | 0.5 | 50 | 30 | 1,240 | 1,260 | A |

TABLE 1-continued

| Ex. No. *1 | Metallic soap and amount*2 (parts/ 100 parts of TiO$_2$) | Heat-treating condition*3 Temp (° C.) | Heat-treating condition*3 Time (hr) | Content of TiO$_2$ in master batch (wt. %) | Content of TiO$_2$ in resin composition (wt. %) | Content of moisture in master batch (ppm) | Content of moisture in resin composition (ppm) | State of coating |
|---|---|---|---|---|---|---|---|---|
| 4  | "     | 4   | 125 | 0..5 | 50 | 30 | 740   | 750   | A |
| 5  | "     | 4   | 125 | 0.5  | 50 | 30 | 1,180 | 1,200 | B |
| 6  | "     | 4   | 125 | 0.5  | 50 | 30 | 890   | 890   | A |
| 7  | "     | 4   | 125 | 0.5  | 50 | 30 | 1,270 | 1,290 | B |
| 8  | "     | 4   | 125 | 0.5  | 50 | 30 | 900   | 910   | A |
| 9  | "     | 4   | 125 | 0.5  | 50 | 30 | 1,320 | 1,350 | B |
| 10 | "     | 4   | 125 | 0.5  | 50 | 30 | 1,340 | 1,360 | B |
| 11 | "     | 4   | 125 | 0.5  | 50 | 30 | 1,260 | 1,280 | B |
| 12 | "     | 4   | 125 | 0.5  | 50 | 30 | 1,080 | 1,100 | B |
| 13 | "     | 4   | 125 | 0.5  | 50 | 30 | 1,160 | 1,190 | A |
| 14 | "     | 4.8 | 125 | 0.5  | 50 | 30 | 1,160 | 1,180 | A |
| 15 | "     | 1.5 | 125 | 0.5  | 50 | 30 | 1,260 | 1,280 | B |
| 16 | "     | 4   | 125 | 0.5  | 70 | 45 | 920   | 930   | A |
| 17 | "     | 4   | 80  | 0.5  | 50 | 30 | 1,240 | 1,260 | B |
| 18 | "     | 4   | 180 | 0.5  | 50 | 30 | 960   | 980   | A |
| 19 | Ca-St | 4   | 125 | 0.5  | 50 | 30 | 1,180 | 1,200 | B |
| 20 | Zn-St | 4   | 125 | 0.5  | 50 | 30 | 1,380 | 1,390 | B |
| C1 | "     | 4   | 125 | 0.5  | 50 | 30 | 1,940 | 1,990 | D |
| C2 | "     | 4   | 125 | 0.5  | 50 | 30 | 1,980 | 2,010 | D |
| C3 | "     | 4   | 125 | 0.5  | 50 | 30 | 1,780 | 1,820 | D |
| C4 | "     | 4   | 125 | 0.5  | 50 | 30 | 1,960 | 1,990 | D |
| C5 | "     | 4   | 125 | 0.5  | 50 | 30 | 1,620 | 1,650 | C |
| C6 | "     | 0.5 | 125 | 0.5  | 50 | 30 | 1,680 | 1,710 | C |
| C7 | "     | 6   | 125 | 0.5  | 50 | 30 | 1,680 | 1,720 | C |
| C8 | "     | 4   | 60  | 0.5  | 50 | 30 | 1,640 | 1,660 | D |
| C9 | "     | 4   | 220 | 0.5  | 50 | 30 | 1,580 | 1,610 | C |
| C10| "     | 4   | 125 | 0.5  | 50 | 30 | 1,680 | 1,720 | D |

*1 C: Comparative Example (outside the claim of invention)
*2 Metallic soap
   Zn-St: Zinc stearate
   Ca-St: Calcium stearate
*3 Conditions (temperature and time) of heat-treating the titanium dioxide pigment mixture after the pigment mixture is kneaded with the metallic soap.

TABLE 2

| Ex. No. *1 | Type of TiO$_2$ and average particle diameter (μm) | Alumina hydrate treatment and amount *2 (wt %) | Organopolysiloxane*3 and amount (parts/ 100 parts TiO$_2$) | | Average diameter of atomized droplets (μm) | Heat-treating conditions*4 Temp (° C.) | Heat-treating conditions*4 Time (hr) |
|---|---|---|---|---|---|---|---|
| 1  | Rutile  0.25 | 0.5 | MeMeO-PS | 1.0 | 15 | 150 | 1 |
| 2  | Rutile  0.25 | NC  | MeMeO-PS | 1.0 | 19 | 150 | 1 |
| 3  | Anatase 0.2  | 0.5 | MeMeO-PS | 1.0 | 30 | 150 | 1 |
| 4  | Anatase 0.2  | NC  | MeMeO-PS | 1.0 | 60 | 150 | 1 |
| 5  | Anatase 0.2  | 0.5 | MeMeO-PS | 0.2 | 21 | 150 | 1 |
| 6  | Anatase 0.2  | 0.5 | MeMeO-PS | 1.7 | 17 | 150 | 1 |
| 7  | Anatase 0.2  | 0.5 | MeMeO-PS | 2.8 | 16 | 150 | 1 |
| 8  | Anatase 0.2  | 0.5 | MeMeO-PS | 1.0 | 3  | 150 | 1 |
| 9  | Anatase 0.2  | 0.5 | MeMeO-PS | 1.0 | 90 | 150 | 1 |
| 10 | Anatase 0.2  | 0.5 | MeH-PS   | 1.0 | 18 | 150 | 1 |
| 11 | Anatase 0.2  | 0.5 | DMe-PS   | 1.0 | 19 | 150 | 1 |
| 12 | Anatase 0.2  | 0.5 | MePh-PS  | 1.0 | 20 | 150 | 1 |
| 13 | Anatase 0.2  | 0.5 | MeMeO-PS | 1.0 | 22 | 150 | 1 |
| 14 | Anatase 0.2  | 0.5 | MeMeO-PS | 1.0 | 16 | 150 | 1 |
| 15 | Anatase 0.2  | 0.5 | MeMeO-PS | 1.0 | 18 | 150 | 1 |
| 16 | Anatase 0.2  | 0.5 | MeMeo-PS | 1.0 | 20 | 150 | 1 |
| 17 | Anatase 0.2  | 0.5 | MeMeO-PS | 1.0 | 13 | 150 | 1 |
| 18 | Anatase 0.2  | 0.5 | MeMeO-PS | 1.0 | 17 | 150 | 1 |
| 19 | Anatase 0.2  | 0.5 | MeMeO-PS | 1.0 | 24 | 150 | 1 |
| 20 | Anatase 0.2  | 0.5 | MeMeO-PS | 1.0 | 23 | 150 | 1 |
| C1 | Anatase 0.2  | 0.5 | MeMeO-PS | 1.0 | 0.8 | 150 | 1 |

TABLE 2-continued

| Ex. No. *1 | Type of TiO₂ and average particle diameter ($\mu$m) | Alumina hydrate treatment and amount *2 (wt %) | Organopoly- siloxane*3 and amount (parts/ 100 parts TiO₂) | | Average diameter of atomized droplets ($\mu$m) | Heat-treating conditions*4 | |
|---|---|---|---|---|---|---|---|
| | | | | | | Temp (° C.) | Time (hr) |
| C2 | Anatase 0.2 | 0.5 | MeMeO-PS | 1.0 | 0.5 | 150 | 1 |
| C3 | Anatase 0.2 | 0.5 | MeMeO-PS | 1.0 | 120 | 150 | 1 |
| C4 | Anatase 0.2 | 0.5 | MeMeO-PS | 0.06 | 23 | 150 | 1 |
| C5 | Anatase 0.2 | 0.5 | MeMeO-PS | 3.5 | 19 | 150 | 1 |
| C6 | Anatase 0.2 | 0.5 | MeMeO-PS | 0.9 | 18 | 150 | 1 |
| C7 | Anatase 0.2 | 0.5 | MeMeO-PS | 1.2 | 24 | 150 | 1 |
| C8 | Anatase 0.2 | 0.5 | MeMeO-PS | 0.8 | 11 | 150 | 1 |
| C9 | Anatase 0.2 | 0.5 | MeMeO-PS | 1.0 | 18 | 150 | 1 |
| C10 | Anatase 0.2 | 0.5 | MeMeO-PS | 1.0 | 25 | 150 | 1 |

*1 C: Comparative Example (outside the claim of invention)
*2 Aluminum hydrate treatment
   NC: not conducted
   0.5: amount of alumina hydrate used is 0.5 wt. % as alumina
*3 Organopolysiloxane
   MeMeO-PS Methylmethoxypolysiloxane*
   MeH-PS Methylhydrogenpolysiloxane
   DMe-PS Dimethylpolysiloxane
   MePh-PS Methylphenylpolysiloxane
*4 Conditions (temperature and time) of heat-treating the organopolysiloxane-atomized titanium dioxide

What is claimed is:

1. A process for preparing a thermoplastic resin composition comprising a thermoplastic resin and a titanium dioxide pigment, which comprises the steps of:
    atomizing 0.1 to 3.0 parts by weight of an organopolysiloxane as droplets having an average diameter of 1 to 100 $\mu$m within a fluidized powder layer of 100 parts by weight of a titanium dioxide pigment;
    mixing 1 to 5 parts by weight of a metallic soap with 100 parts by weight of the organopolysiloxane-treated titanium dioxide pigment;
    heat-treating the thus-obtained mixture at a temperature of 70 to 200° C. for a period of 10 minutes to 2 hours; and then
    mixing a thermoplastic resin with the heat-treated mixture.

2. The process for preparing a thermoplastic resin composition as claimed in claim 1, wherein the titanium dioxide pigment has an average particle diameter of 0.1 to 0.3 $\mu$m.

3. The process for preparing a thermoplastic resin composition as claimed in claim 1, wherein the titanium dioxide pigment has been surface-treated with aluminum oxide hydrate in an amount of 0.1 to 0.8 parts by weight as aluminum oxide based on 100 parts by weight of the titanium dioxide pigment.

4. The process for preparing a thermoplastic resin composition as claimed in claim 1, wherein the organopolysiloxane is a compound with a siloxane bond, represented by the following formula:

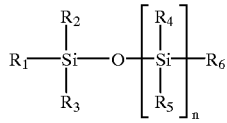

wherein $R_1$, $R_2$, $R_3$, $R_4$, $R_5$ and $R_6$ independently represent a hydrogen atom, a hydroxyl group, an alkyl group having 1 to 7 carbon atoms, a cycloalkyl group having 3 to 8 carbon atoms, an aryl group having 6 to 14 carbon atoms, an aralkyl group having 7 to 12 carbon atoms, an alkenyl group having 2 to 8 carbon atoms, an alkoxy group having 1 to 7 carbon atoms, an aryloxy group having 6 to 14 carbon atoms, an aralkyloxy group having 7 to 12 carbon atoms, an alkenyloxy group having 2 to 8 carbon atoms, and n is an integer of at least 1.

5. The process for preparing a thermoplastic resin composition as claimed in claim 1, wherein the organopolysiloxane-atomized titanium dioxide pigment is heat-treated at a temperature of 100 to 150° C. before the mixing with the metallic soap.

6. The process for preparing a thermoplastic resin composition as claimed in claim 1, wherein 20 to 80% by weight, based on the weight of the thermoplastic resin composition, of the thermoplastic resin is mixed with the heat-treated titanium dioxide pigment mixture.

* * * * *